(12) United States Patent
Matsunaga et al.

(10) Patent No.: US 11,312,394 B2
(45) Date of Patent: Apr. 26, 2022

(54) VEHICLE CONTROL DEVICE

(71) Applicant: HONDA MOTOR CO., LTD., Tokyo (JP)

(72) Inventors: Hideki Matsunaga, Wako (JP); Takumi Machida, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 138 days.

(21) Appl. No.: 16/754,937

(22) PCT Filed: Oct. 11, 2017

(86) PCT No.: PCT/JP2017/036848
§ 371 (c)(1),
(2) Date: Apr. 9, 2020

(87) PCT Pub. No.: WO2019/073553
PCT Pub. Date: Apr. 18, 2019

(65) Prior Publication Data
US 2020/0255033 A1  Aug. 13, 2020

(51) Int. Cl.
*B60W 60/00* (2020.01)
*G08G 1/16* (2006.01)
(Continued)

(52) U.S. Cl.
CPC .. *B60W 60/0027* (2020.02); *B60W 30/18159* (2020.02); *G05D 1/0214* (2013.01);
(Continued)

(58) Field of Classification Search
CPC ......... B60W 60/0027; B60W 60/0016; B60W 2555/60; B60W 2552/50; B60W 2552/00;
(Continued)

(56) References Cited

U.S. PATENT DOCUMENTS 9,475,491 B1 * 10/2016 Nagasaka ....... B60W 30/18163
10,259,458 B2 * 4/2019 Yoo ................. B60W 30/18163

FOREIGN PATENT DOCUMENTS

JP  2011-113325 A  6/2011
JP  2012-226618 A  11/2012
(Continued)

OTHER PUBLICATIONS

PCT/ISA/210 from International Application PCT/JP2017/036848 with the English translation thereof.

*Primary Examiner* — Abby Y Lin
*Assistant Examiner* — Karston G. Evans
(74) *Attorney, Agent, or Firm* — Carrier Blackman & Associates, P.C.; Joseph P. Carrier; Jeffrey T. Gedeon (57) ABSTRACT

Provided is a vehicle control device capable of suitably controlling the driving (autonomous driving or driving assistance) of a host vehicle when the host vehicle turns left from a side road into a main road (to merge into traffic). When the host vehicle is about to turn left into the main road, if the host vehicle recognizes that another vehicle is traveling along the main road behind the point [the intersection region of the side road and the main road] where the host vehicle enters the main road, then the host vehicle determines a risk that is associated with the other vehicle and that is dependent on the traveling position of the other vehicle, and determines whether or not to enter the main road, on the basis of the determined risk associated with the other vehicle.

6 Claims, 6 Drawing Sheets

(51) Int. Cl.
  *G08G 1/00* (2006.01)
  *B60W 30/18* (2012.01)
  *B60W 30/095* (2012.01)
  *G05D 1/02* (2020.01)
  *B60W 50/00* (2006.01)

(52) U.S. Cl.
  CPC ............ *G05D 1/0287* (2013.01); *G08G 1/166* (2013.01); *G08G 1/167* (2013.01); *G08G 1/20* (2013.01); *B60W 30/0956* (2013.01); *B60W 50/0097* (2013.01); *B60W 2552/00* (2020.02); *B60W 2554/80* (2020.02); *G05D 2201/0213* (2013.01)

(58) Field of Classification Search
  CPC ....... B60W 2554/80; B60W 30/18159; B60W 30/18145; B60W 30/18154; B60W 60/00272; B60W 30/0956; B60W 50/0097; G05D 1/0214; G05D 1/0287; G05D 2201/0213; G08G 1/166; G08G 1/167; G08G 1/20; G08G 1/095; G08G 1/163
  See application file for complete search history.

(56) References Cited

FOREIGN PATENT DOCUMENTS

JP          2012226618 A   *   11/2012
KR        20170097435 A   *   8/2017

* cited by examiner

| | SPECIFIED REGION | |
|---|---|---|
| | INTERSECTION | RAILWAY CROSSING |
| OTHER VEHICLE RISK LEVEL RL | IS THERE SPACE CORRESPONDING TO TWO VEHICLES AHEAD IN ENTRY DIRECTION? | |
| | YES 0 / NO 0.5 | YES 0 / NO 1 |
| LEFT TURN ENTRY CONDITION | SPACE FOR TWO VEHICLES IS FORMED FORWARD IN ENTRY DIRECTION OR SPACE FOR ONE VEHICLE IS FORMED FORWARD IN ENTRY DIRECTION + OTHER VEHICLE AHEAD IN ENTRY DIRECTION IS IN TRAVELING STATE | SPACE FOR TWO VEHICLES IS FORMED FORWARD IN ENTRY DIRECTION |

96 → OTHER VEHICLE RISK LEVEL RL
98 → LEFT TURN ENTRY CONDITION

VEHICLE CONTROL DEVICE

TECHNICAL FIELD

The present invention relates to a vehicle control device that controls driving (automated driving or a driving assist) of a host vehicle that enters (merges) from one travel path, for example, a side road (hereinafter, also including a byroad) into another travel path such as a main road or the like (including a T-junction) that intersects the side rode.

BACKGROUND ART

On roads, there are regions, such as at a railway crossing or at an intersection having a traffic signal, where switching occurs between a passable state and a non-passable state. Hereinafter, such a region will be referred to as a specified region.

A vehicle that attempts to pass through such a specified region is required to travel without stopping (remaining) in the specified region.

For example, in Japanese Laid-Open Patent Publication No. 2012-226618 (hereinafter referred to as JP2012-226618A), a driving assist device is disclosed in which driving assistance is provided to a vehicle (hereinafter, for convenience, referred to as a main road vehicle) that is planning to pass through (cross over) a railway crossing, at a location just before the railway crossing where a railway track and a travel path on which the vehicle travels (hereinafter, for convenience, referred to as a main road) intersect each other.

In the driving assist device which is installed in the main road vehicle, in the case that a side road is provided alongside a railway line ahead of a railway crossing, a determination is made as to whether or not there is a vehicle entering into the main road from the side road. In addition, in the case it is determined that there is a vehicle entering into the main road from the side road, the main vehicle is warned and notified through a monitor and a buzzer so that the main vehicle does not enter into the railway crossing (paragraphs [0036] and [0037] of JP2012-226618A).

SUMMARY OF INVENTION

Incidentally, after the main road vehicle, which is planning to pass through the railway crossing on the main road, has started to enter into the railway crossing, there may be cases in which a vehicle (hereinafter, for convenience, referred to as a side road vehicle) enters into the main road from a side road.

In this manner, in the case that the side road vehicle enters into an intersecting region between the main road and the side road before the main road vehicle that is traveling within the railway crossing exits from inside the railway crossing, there is a possibility that an emergency situation may arise in which the main road vehicle is forced to stop inside of the railway crossing. However, in JP2012-226618A, there is no disclosure concerning how to prevent such an emergency situation from occurring, and room remains for improvement.

The present invention has been devised taking into consideration the aforementioned problem, and has the object of providing a vehicle control device which is capable of appropriately controlling driving (automated driving or a driving assist) of a host vehicle that enters (merges) from one travel path into another travel path that intersects the one travel path.

The vehicle control device according to the present invention is a vehicle control device that performs a driving control for a host vehicle, the vehicle control device comprising:

an external environment recognition unit configured to recognize another vehicle existing in a vicinity of the host vehicle;

a risk determination unit which, in a case that the host vehicle is planning to enter from one travel path in which the host vehicle is traveling into another travel path through an intersecting position that intersects the one travel path, and when the external environment recognition unit recognizes that the other vehicle traveling in the other travel path is at a more rearward travel position on the other travel path than the intersecting position, is configured to determine a risk to the other vehicle that corresponds to the travel position; and an entry permission determination unit configured to determine whether or not to permit the host vehicle to enter into the other travel path, in accordance with the determined risk to the other vehicle.

According to the present invention, in the case it is recognized that the other vehicle is at a more rearward travel position on the other travel path than the entry point (intersecting position) of the host vehicle, then the host vehicle, which is planning to enter into the other travel path (including a T-junction) that intersects the one travel path, determines the risk to the other vehicle that corresponds to the travel position of the other vehicle, and determines whether or not to permit the host vehicle to enter into the other travel path in accordance with the determined risk to the other vehicle. Therefore, driving of the host vehicle that enters into the other travel path can be appropriately controlled while suppressing the occurrence of the risk to the other vehicle.

According to the present invention, it is possible to appropriately control driving (automated driving or a driving assist) of the host vehicle that enters (merges) from the one travel path into the other travel path that intersects the one travel path.

In this case, the risk determination unit preferably determines a risk that, by the host vehicle entering into the other travel path, the other vehicle stops at a more rearward position on the other travel path than the intersecting position, the risk determination unit determining the risk in accordance with a type of a stopping position.

In this manner, the risk that, by the host vehicle entering into the other travel path, the other vehicle stops at a more rearward position than the entry point (intersecting position) of the host vehicle, is determined in accordance with the type of the stopping position, and therefore, the risk to the other vehicle can be determined more reliably, and driving of the host vehicle can be more appropriately controlled.

Further, the risk determination unit preferably determines that there is a risk to the other vehicle in a case that the type of the stopping position is a railway crossing or an intersection.

In this manner, in the case that the type of the stopping position is a railway crossing or an intersection, a determination is made that there is a risk to the other vehicle, and therefore, the determination that there is a risk to the other vehicle can be easily performed.

Furthermore, the risk determination unit preferably determines that a risk level to the other vehicle is greater in a case that the stopping position is the railway crossing than in a case that the stopping position is the intersection.

In this manner, since the risk level to the other vehicle is determined to be greater in the case that the stopping position is a railway crossing than in the case that the stopping position is an intersection, the determination can be made in line with the actual traffic scenario.

Further still, the risk determination unit may determine a risk level to the other vehicle on a basis of the type of the stopping position, and a length of an empty space formed in the other travel path in front of the other vehicle.

In this manner, since the risk level is determined on the basis of the length of the empty space formed in front of the other vehicle that travels in the other travel path, and the type of the stopping position, the risk determination can be made in a manner that is suitable for the traffic scenario.

Further still, the entry permission determination unit may change the entry condition for entry into the travel path of the other vehicle in accordance with the risk level to the other vehicle.

In the foregoing manner, since the entry condition for entry into the travel path of the other vehicle is changed in accordance with the risk level to the other vehicle, while suppressing the risk to the other vehicle, driving of the host vehicle can be controlled appropriately in line with the actual traffic scenario, and entry into the travel path of the other vehicle is made possible.

DESCRIPTION OF EMBODIMENTS

Preferred embodiments of a driving control device according to the present invention will be presented and described in detail below with reference to the accompanying drawings. In the following description, a vehicle (driver's own vehicle) which is the subject of the description will be referred to as a host vehicle, whereas vehicles other than the host vehicle will be referred to as other vehicles. Further, although an exemplary description will be made of a left-hand traffic situation for the vehicle, the present invention can similarly be applied to a right-hand traffic situation. Furthermore, in the drawings to be described below, the same constituent elements or corresponding constituent elements may be described using the same reference numerals.

Figure 1:
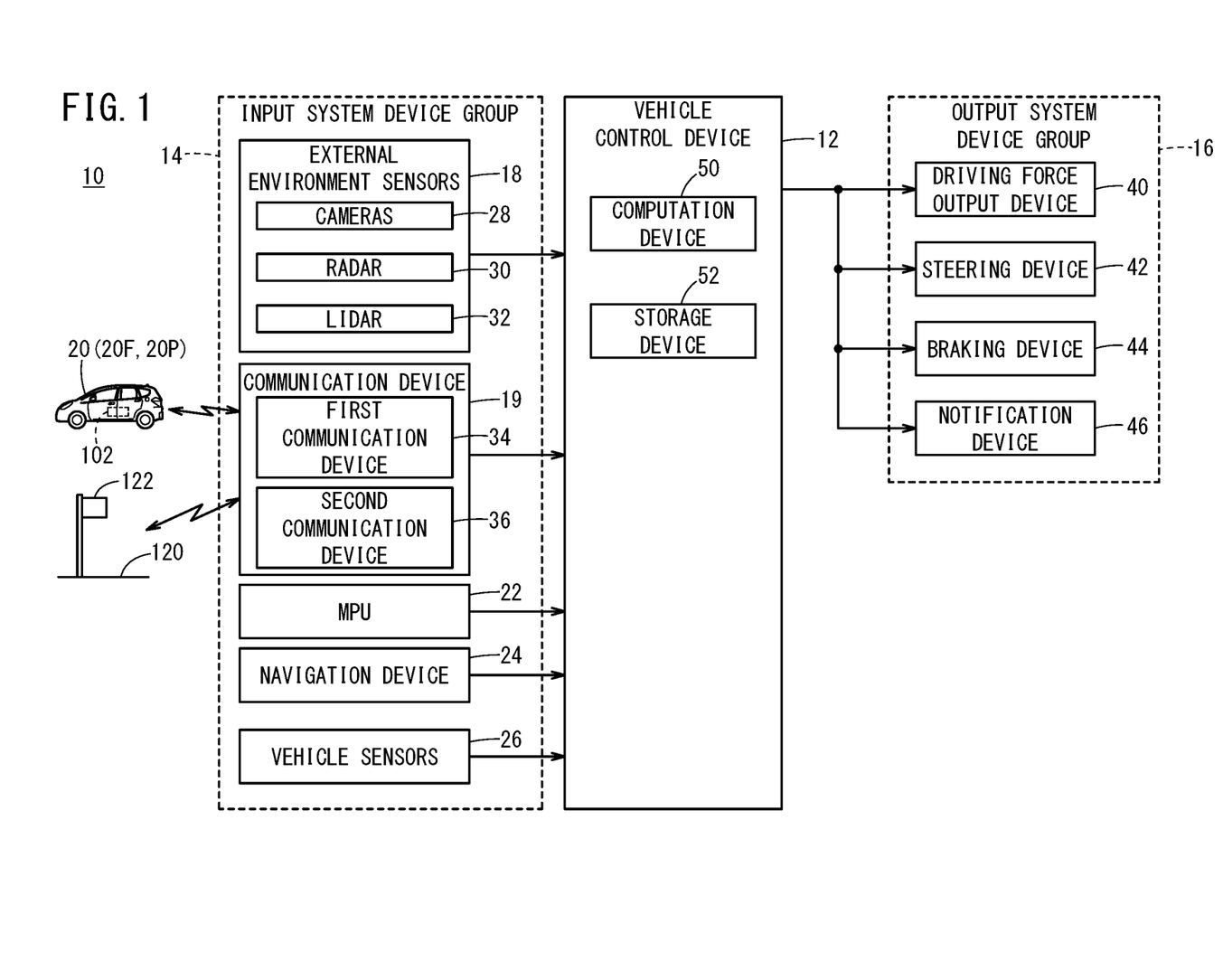
FIG. 1 is a block diagram of a host vehicle equipped with a vehicle control device according to an embodiment.
Figure 2:
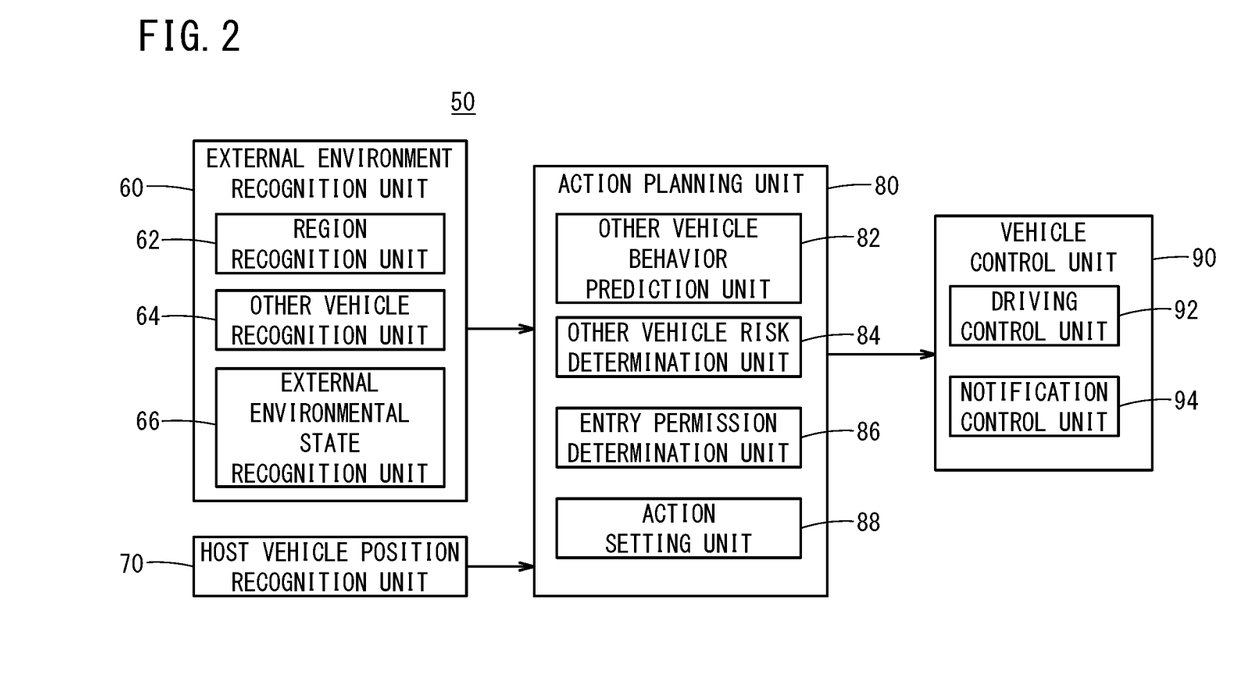
FIG. 2 is a functional block diagram of the vehicle control device.
Figure 3:
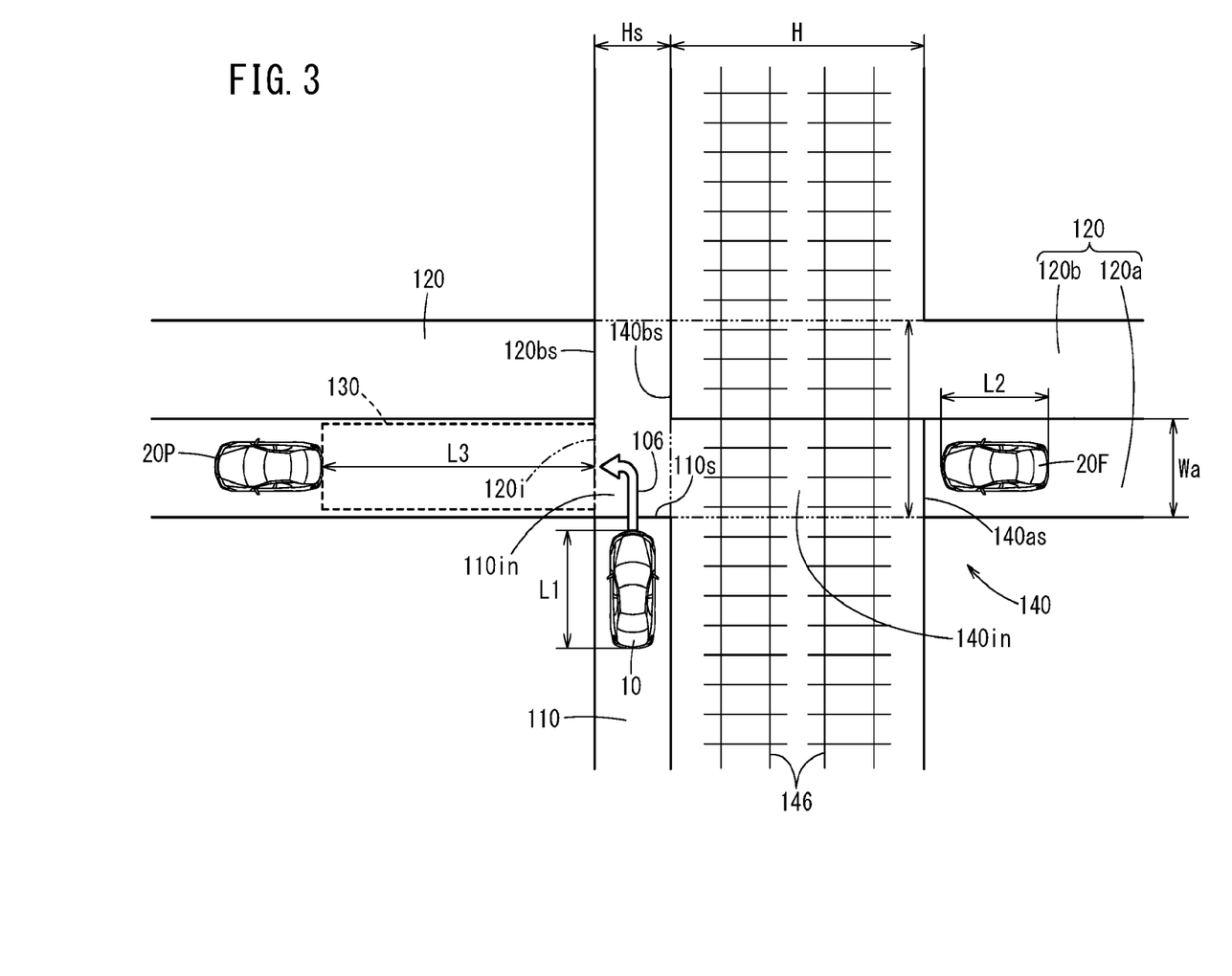
FIG. 3 is a schematic plan view showing a host vehicle or the like that is approaching a left turn into a main road from a byroad immediately after a railway crossing of the main road.
Figure 4:
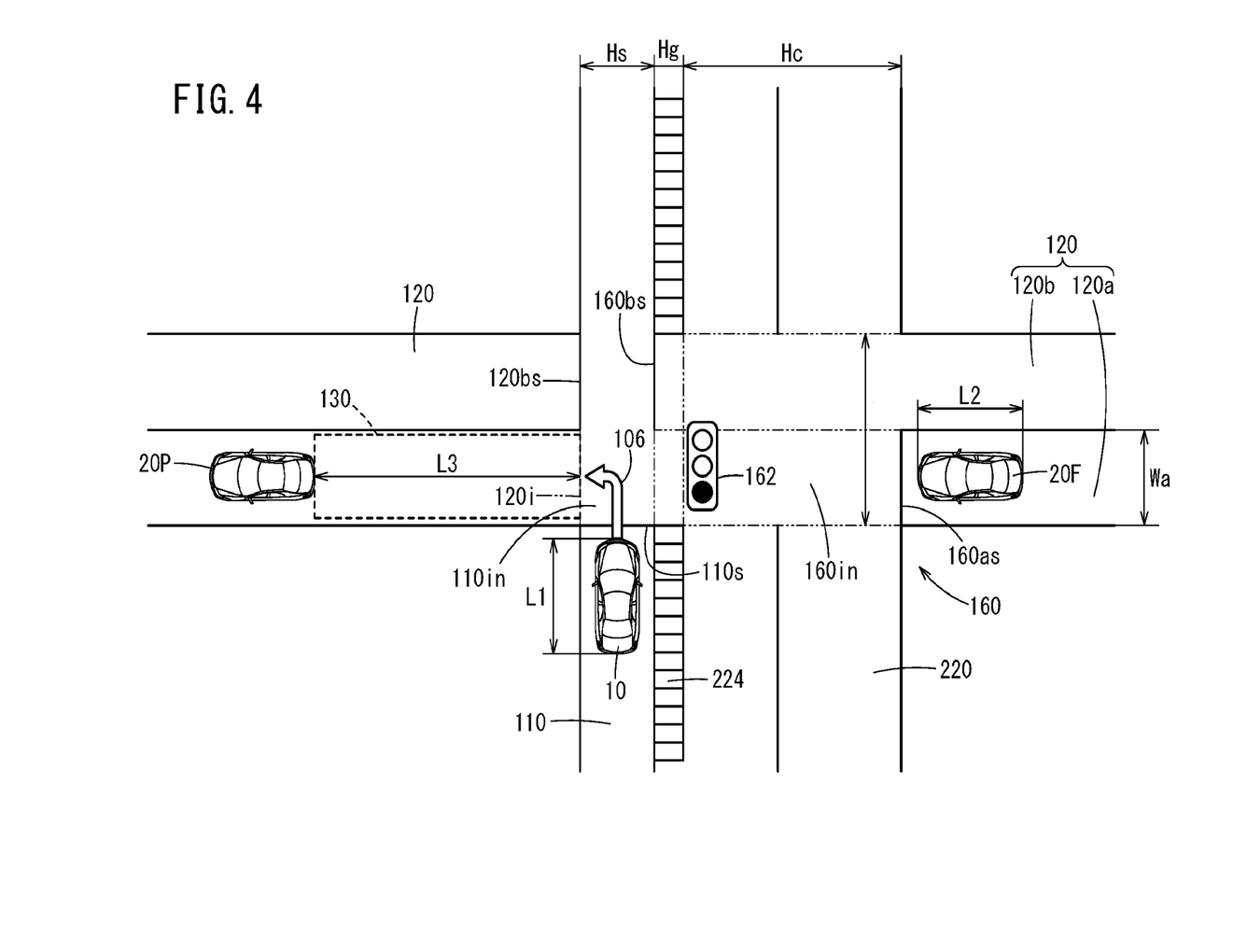
FIG. 4 is a schematic plan view showing a host vehicle or the like that is approaching a left turn into a main road from a byroad immediately after an intersection of the main road.

FIG. 1 is a block diagram of a host vehicle 10 equipped with a vehicle control device 12 according to a present embodiment. FIG. 2 is a functional block diagram of the vehicle control device 12. FIG. 3 is a schematic plan view showing the host vehicle 10 or the like, which is approaching a left turn into a main road 120 from a side road (byroad) 110 immediately after a railway crossing 140 of the main road 120. FIG. 4 is a schematic plan view showing the host vehicle 10 or the like, which is approaching a left turn into the main road 120 from the side road (byroad) 110 immediately after an intersection 160 of the main road 120 (220).

1. Configuration of Host Vehicle 10

As shown in FIG. 1, the host vehicle 10 includes a vehicle control device 12, an input system device group 14 which acquires or stores various information input by the vehicle control device 12, and an output system device group 16 which is operated in response to various instructions output by the vehicle control device 12. The host vehicle 10 is an automatically driven vehicle (including a fully automatically driven vehicle) in which driving operations are performed by the vehicle control device 12, or a driving assisted vehicle in which portions of the driving operations are assisted.

[1.1. Input System Device Group 14]

In the input system device group 14, there are included external environment sensors 18 that detect a state of the surrounding vicinity (external environment) around the host vehicle 10, a communication device 19 which carries out transmission and reception of information to and from various communication devices located externally of the host vehicle 10, an MPU (high precision map) 22 the positional precision of which is less than or equal to centimeter units, a navigation device 24 that generates a travel route to a destination together with measuring a travel position of the host vehicle 10, and vehicle sensors 26 that detect the traveling state of the host vehicle 10.

Among the external environment sensors 18, there are included one or more cameras 28 that capture images of the external environment, and one or more radar devices 30 and one or more LIDAR (Light Detection and Ranging) devices 32 that detect the distance between the host vehicle 10 and other surrounding objects, as well as the relative speed between the host vehicle 10 and the surrounding objects.

In the communication device 19, there are included a first communication device 34 that performs inter-vehicle communications with communication devices 102 disposed in other vehicles 20 (20F, 20P), and a second communication device 36 that performs road-to-vehicle communications with communication devices 122 provided in an infrastructure such as the main road 120 or the like.

The navigation device 24 includes a satellite navigation system and a self-contained navigation system.

The vehicle sensors 26 include a vehicle speed sensor, an acceleration sensor, a yaw rate sensor, an inclination sensor, and the like, none of which are shown.

[1.2. Output System Device Group 16]

In the output system device group 16, there are included a driving force output device 40, a steering device 42, a braking device 44, and a notification device 46.

The driving force output device 40 includes a driving force ECU (Electronic Control Unit), and a drive source including an engine and/or a driving motor.

The driving force output device 40 generates a driving force in the host vehicle 10 in accordance with an operation of an accelerator pedal performed by the vehicle occupant, or a driving control instruction output from the vehicle control device 12.

The steering device 42 includes an electric power steering system (EPS) ECU and an EPS actuator. The steering device 42 generates a steering force in the host vehicle 10 in accordance with an operation of the steering wheel performed by the vehicle occupant, or a steering control instruction output from the vehicle control device 12.

The braking device 44 includes a brake ECU and a brake actuator. The braking device 44 generates a braking force in the host vehicle 10 in accordance with an operation of the brake pedal performed by the vehicle occupant, or a braking control instruction output from the vehicle control device 12.

The notification device 46 includes a notification ECU, and an information transmission device (a display device, an audio device, a haptic device, etc.). The notification device 46 issues a notification (a driving assist operation is also carried out in the case that the host vehicle 10 is a vehicle that requires a driving assist and not automated driving) with respect to the vehicle occupant in accordance with a notification instruction output from the vehicle control device 12 or another ECU.

[1.3. Vehicle Control Device 12]

The vehicle control device 12 comprises an ECU, and includes a computation device 50 such as a processor, and a storage device 52 such as a ROM and a RAM. The vehicle control device 12 realizes various functions by the computation device 50 executing programs stored in the storage device 52.

As shown in FIG. 2, the computation device 50 functions as an external environment recognition unit 60, a host vehicle position recognition unit 70, an action planning unit 80, and a vehicle control unit 90, etc.

On the basis of information output from the external environment sensors 18, the external environment recognition unit 60 recognizes the circumstances and objects such as other vehicles and the like in the vicinity of the host vehicle 10. The external environment recognition unit 60 includes a region recognition unit 62, an other vehicle recognition unit 64, and an external environmental state recognition unit 66.

Based on the image information from the cameras 28 and/or the high precision map 22, the region recognition unit 62 recognizes the existence, the type, the size, and the boundary position, etc., of the specified region {the railway crossing 140, the intersection 160, a drawbridge, or the like} positioned in respective directions (forward, leftward, and rightward) in relation to the travel trajectory (direction of progress) of the host vehicle 10.

Based on the image information from the cameras 28 and/or the detection information from the radar devices 30 and the LIDAR devices 32, the other vehicle recognition unit 64 recognizes the existence, the position, the size, and the type of other vehicles 20 (20F, 20P) which are traveling or stopped in the vicinity of the host vehicle 10, together with recognizing the distance and the relative speed between the host vehicle 10 and the other vehicles 20 (20F, 20P).

Based on the image information from the cameras 28, the external environmental state recognition unit 66 recognizes the overall road environment, for example, the shape of the road, the road width, the positions of lane markings, the number of lanes, the lane width, the illuminated state of a traffic signal device 162, and the open or closed state of the crossing gate.

The shape of the road, the road width, the positions of the lane markings, the number of lanes, and the lane width may also be recognized using the high precision map 22.

Based on information output from the MPU 22 and the navigation device 24, the host vehicle position recognition unit 70 recognizes the travel position of the host vehicle 10 and the map information in the vicinity of the travel position.

The action planning unit 80 determines the traveling state of the host vehicle 10 on the basis of the recognition results of the external environment recognition unit 60 and the host vehicle position recognition unit 70, and formulates an action (generation of a trajectory or the like) for the host vehicle 10. The action planning unit 80 includes an other vehicle behavior prediction unit 82, an other vehicle risk determination unit 84, an entry permission determination unit 86, and an action setting unit 88.

The other vehicle behavior prediction unit 82 predicts the behavior of the other vehicle 20F on the basis of the recognition result of the other vehicle recognition unit 64.

Based on the recognition result of the external environment recognition unit 60 and the prediction result of the other vehicle behavior prediction unit 82, the other vehicle risk determination unit 84 determines whether or not a space 130 (empty space) indicated by the length L3, in the present embodiment, a space 130 for two vehicles, and which enables entry of the host vehicle 10 having a vehicle length of L1 and the other vehicle 20F having a vehicle length of L2, exists on the main road 120 within an intersecting region 110*in* (also referred to as an intersecting position) between the side road 110 and the main road 120 more in front of (on a side where the other vehicle 20P exists) an entrance 120*i* where the host vehicle 10 enters into the main road 120.

In accordance with the type (railway crossing 140 or intersection 160) of the specified region (in the present embodiment, the railway crossing 140 or the intersection 160), the other vehicle risk determination unit 84 changes the risk level RL at which it becomes impossible for the other vehicle 20F to move within a railway crossing interior 140*in* (FIG. 3) or within an intersection interior 160*in* (FIG. 4).

Moreover, as shown in FIG. 3, in the railway crossing interior 140*in* for the other vehicle 20F, and within the main road 120 (which is made up from another lane 120*a* and an oncoming lane 120*b* opposite to the other lane 120*a*), there is a substantially rectangular region (Wa×H) which is formed by the width (other lane width Wa) of the other lane 120*a* and the railway crossing length H. However, the railway crossing interior 140*in* may be further expanded to a substantially rectangular region [Wa×(H+Hs)] which includes the region (referred to as an intersecting region) 110*in* which is formed by the side road width Hs for the host vehicle 10 and the other lane width Wa.

A stop line 140*as* and a stop line 140*bs* are provided in the railway crossing 140, a stop line 110*s* is provided in the side road 110, and a stop line 120*bs* is provided in the oncoming lane 120*b*.

On the other hand, as shown in FIG. 4, in the intersection interior 160*in* for the other vehicle 20F, there is a substantially rectangular region (Wa×Hc) which is formed by the other lane width Wa intersection length Hc (width of the intersecting road 220). However, the intersection interior 160*in* may be further expanded to a substantially rectangular region [Wa×(Hc+Hs+Hg)] which includes the region (referred to as an intersecting region) 110*in* which is formed substantially by the other lane width Wa and a length obtained by adding a width (side groove width Hg) of a side groove 224 to the side road width Hs. It should be noted that the side groove width Hg is shorter than the vehicle length L2 of the other vehicle 20F.

A stop line 160*as* and a stop line 160*b* s are provided in the intersection 160, and the stop line 110*s* is provided in the side road 110.

In FIG. 2, on the basis of the recognition result of the external environment recognition unit 60, the entry permission determination unit 86 determines whether the host vehicle 10 is in a state in which it is capable of entering into the main road 120 by making a left turn from the side road 110, or is in an entry incapable state (entry standby state) in which it is incapable of entering into the main road 120.

The action setting unit 88 selects actions that the host vehicle 10 should take on the basis of the recognition results of the external environment recognition unit 60 and the host vehicle position recognition unit 70, and the determination results of the other vehicle behavior prediction unit 82, the other vehicle risk determination unit 84, and the entry permission determination unit 86. In the case that the host vehicle 10 is made to travel, in this instance, in the case of being made to approach a left turn into the intersecting region 110in and merge with the other lane 120a of the main road 120, the travel trajectory targeted by the host vehicle 10 (which is a target traveling trajectory and includes a stopping position) and a vehicle speed targeted thereby (target vehicle speed) are set.

On the basis of the determination result of the action planning unit 80, the vehicle control unit 90 provides operating instructions to the output system device group 16.

The vehicle control unit 90 includes a driving control unit 92 and a notification control unit 94.

The driving control unit 92 generates control instructions in accordance with the target travel trajectory and the target vehicle speed formulated by the action planning unit 80, and outputs the control instructions to the driving force output device 40, the steering device 42, and the braking device 44.

The notification control unit 94 generates notification instructions with respect to the vehicle occupant, and outputs the notification instructions to the notification device 46.

2. Operations of Vehicle Control Device 12

Figure 5:
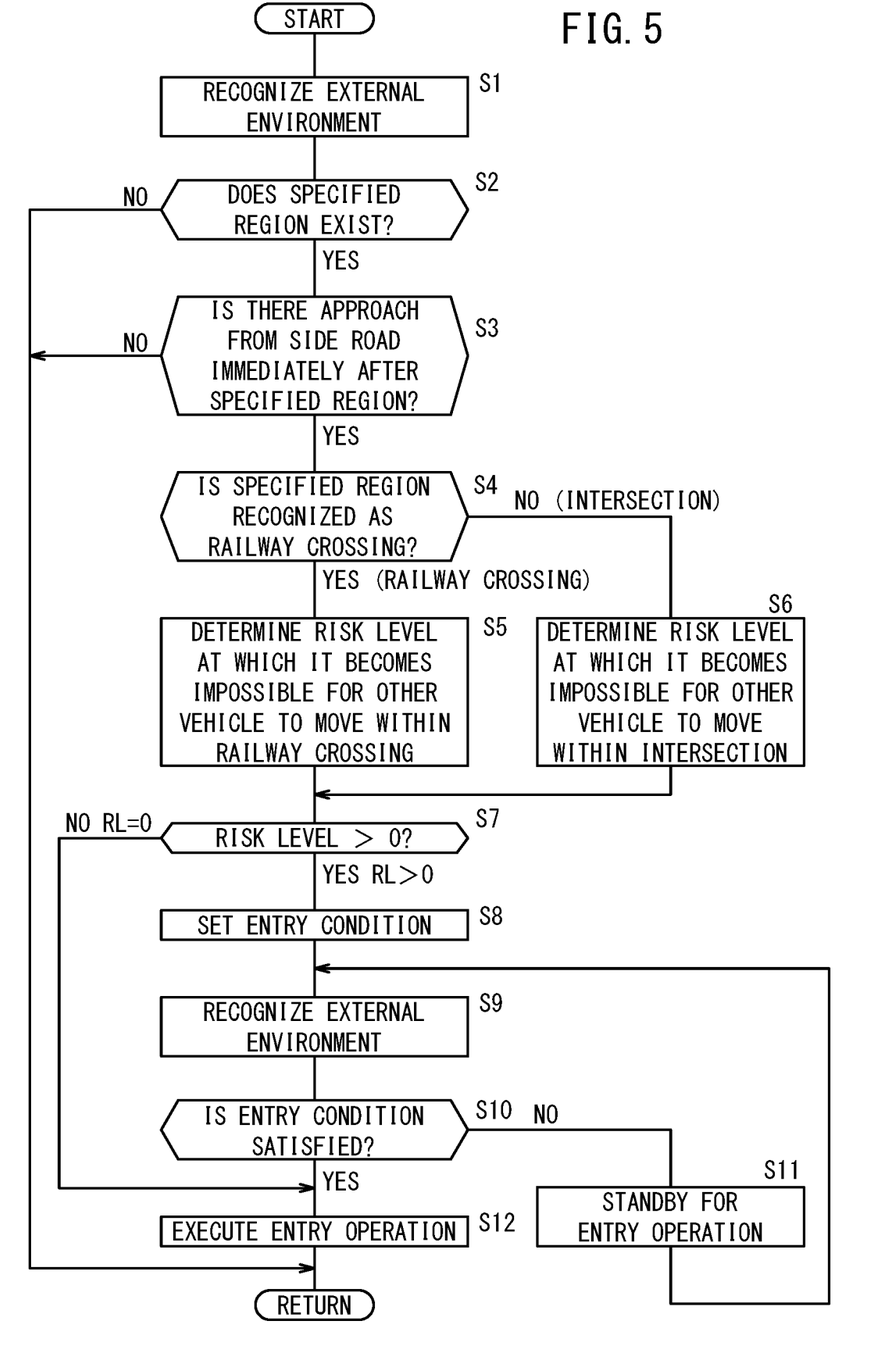
FIG. 5 is a flowchart provided to describe operations of the vehicle control device.

Operations (process steps) of the vehicle control device 12 of the host vehicle 10, which is approaching a left turn from the side road 110 into the main road 120 (other lane 120a), will be described with reference to the flowchart of FIG. 5. The process steps are repeatedly executed while the electric power of the host vehicle 10 is turned on.

In step S1, the external environment recognition unit 60 inputs the most recent information output from the input system device group 14, and recognizes the external environment.

In step S2, the region recognition unit 62 recognizes the region in front of, to the left, and to the right of the host vehicle 10. In the case of recognizing the specified region (the type of travel position), in this instance, in the case of recognizing facilities or structures unique to the railway crossing 140 and the intersection 160, the region recognition unit 62 recognizes the existence of the specified region.

For example, the presence of the railway crossing 140 is recognized by recognizing the crossing gate and a railway track 146. The existence of the intersection 160 is recognized by recognizing the traffic signal device 162 and the main road 120 that crosses in front of the host vehicle 10.

In the case that the specified region exists (step S2: YES), the process transitions to step S3. On the other hand, in the case that the specified region does not exist (step S2: NO), the process temporarily comes to an end and waits for the next cycle.

Upon transitioning from step S2 to step S3, in step S3, the action planning unit 80 determines whether or not the travel trajectory of the host vehicle 10 includes an approach to a left turn from the side road 110 into the main road 120 immediately after the specified region. In the case of there being an approach to a left turn from the side road 110 into the main road 120 immediately after the specified region (step S3: YES), the process transitions to step S4. On the other hand, in the case of there not being an approach to a left turn (step S3: NO), the process temporarily comes to an end and waits for the next cycle.

Upon transitioning from step S3 to step S4, a determination is made as to whether or not the type of specified region (the type of stopping position) is the railway crossing 140. In the case that the region recognition unit 62 recognizes the railway crossing 140 (step S4: YES), the process transitions to step S5. On the other hand, in the case that the region recognition unit 62 recognizes the intersection 160, and more specifically, does not recognize the railway crossing 140 (step S4: NO), the process transitions to step S6.

Figure 6:
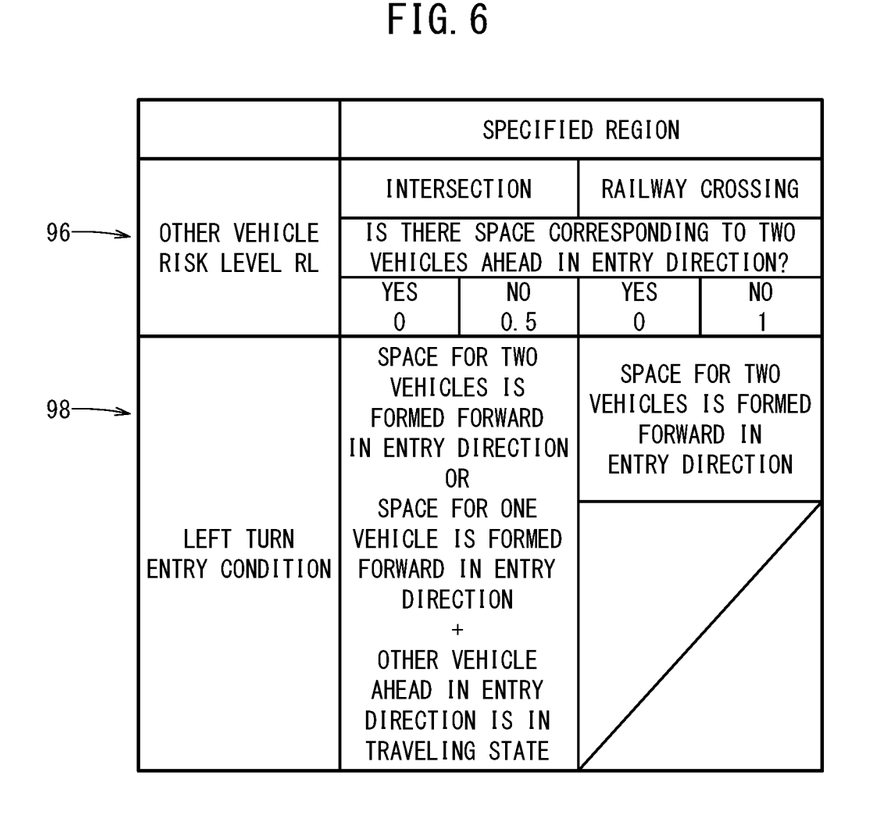
FIG. 6 is a determination table diagram provided as an example of determining a risk level to another vehicle.

Upon transitioning from step S4 to step S5, in step S5, the risk level (other vehicle risk level) RL determination process (referred to as a railway crossing other vehicle risk determination process) at which it becomes impossible for the other vehicle 20F to move within the railway crossing interior 140in is performed by the other vehicle risk determination unit 84 by referring to the column (map) labeled "railway crossing" and shown in an other vehicle risk level determination table 96 in the upper part of FIG. 6.

The other vehicle risk level RL is set to a different value (evaluation value) depending on the type of specified region, which is the intersection 160 and the railway crossing 140 in the present example.

In the risk level determination process of step S5, since the specified region is the railway crossing 140 (see FIG. 3), a determination is made as to whether or not the length L3 of the space 130 (hereinafter also referred to as a space L3) behind the other vehicle (preceding vehicle) 20P as an obstacle in a forward direction from the entrance 120i to the main road 120 in an entry direction 106 of the host vehicle 10 is the space 130 which corresponds to two vehicles (total length L1 of the host vehicle 10+total length L2 of the other vehicle 20F+a certain margin), and in the case of the space L3 being a space corresponding to two vehicles, the other vehicle risk level RL at which it becomes impossible for the other vehicle 20F to move within the railway crossing interior 140in is determined to be a zero value (RL=0), whereas in the case that there is not a space corresponding to two vehicles, the other vehicle risk level RL is determined to be a maximum value of "1" (RL=1).

In step S6, the risk level (other vehicle risk level) RL determination process (referred to as an intersection other vehicle risk determination process) at which it becomes impossible for the other vehicle 20F to move within the intersection interior 160in is performed by the other vehicle risk determination unit 84 by referring to the column (map) labeled "intersection" and shown in the other vehicle risk level determination table 96 in the upper part of FIG. 6.

In the risk level determination process of step S6, taking into consideration that the specified region is the intersection 160 (see FIG. 4), a determination is made as to whether or not the space L3 in the forward direction from the entrance 120i to the main road 120 in the entry direction 106 of the host vehicle 10 is the space which corresponds to two vehicles, and in the case of the space L3 being a space corresponding to two vehicles, the other vehicle risk level RL at which it becomes impossible for the other vehicle 20F to move within the intersection interior 160in is determined to be a zero value (RL=0), whereas in the case that there is not a space corresponding to two vehicles, the other vehicle risk level RL is determined to be an intermediate value of "0.5" (RL=0.5).

Stated otherwise, the risk level RL in the case that the other vehicle 20F has become incapable of moving is set so as to be greater for the railway crossing 140 (RL=1) than for the intersection 160 (RL=0.5).

However, in the case it is recognized that a crossing gate (crossing gate rod) is descending at the railway crossing 140, and in the case that the traffic signal device 162 is displaying a red signal at the intersection 160, the risk level RL at which it becomes impossible for the other vehicle 20F to move may be regarded as being a zero value (RL=0).

After having determined the risk level RL in step S5 or step S6, it is determined in step S7 whether the other vehicle risk level RL exists (RL>0) or does not exist (RL=0).

In the case that the other vehicle risk level RL exists (RL>0) (step S7: YES), the process transitions to step S8.

In step S8, a left turn entry condition for the host vehicle 10 is set by the entry permission determination unit 86 with reference to a left turn entry condition determination table 98 shown in the lower part of FIG. 6.

In the case of the specified region being the railway crossing 140, then in step S8, the left turn entry condition of the host vehicle 10 is set to enable a left turn entry operation to be executed, in the case that the space L3 formed forward in the left turn entry direction 106 of the host vehicle 10 is greater than or equal to a space for two vehicles.

In the case of the specified region being the intersection 160, then in step S8, the left turn entry condition of the host vehicle 10 is set to enable a left turn entry operation to be executed, in the case that the space L3 formed forward in the left turn entry direction 106 of the host vehicle 10 is greater than or equal to a space for two vehicles, or in the case that the space L3 for one vehicle is formed forward in the entry direction, and the other vehicle 20P ahead in the left turn entry direction is in a traveling state.

Next, in step S9, the external environment recognition unit 60 inputs the most recent information output from the input system device group 14, and recognizes the external environment.

Next, in step S10, the entry permission determination unit 86 refers to the external environmental state recognized by the external environmental state recognition unit 66, and determines whether or not the left turn entry condition set in step S8 has been satisfied.

Before the entry condition is satisfied (step S10: NO), in step S11, the action setting unit 88 continues operation of the braking device 44 of the output system device group 16 through the vehicle control unit 90, and places the host vehicle 10 in a left turn entry condition operation standby state, or in other words, stopping of the vehicle is continued. At this time, a notification may be issued through the notification device 46 that sufficient space L3 is not formed in the main road 120 forward in the left turn entry direction 106.

On the other hand, in the case it is determined in step S10 that the entry condition set in step S8 has been satisfied (step S10: YES), then in step S12, the action setting unit 88 drives the output system device group 16 through the vehicle control unit 90, and the left turn entry operation is executed.

Moreover, in the determination of step S7, also in the case that the risk level RL is a zero value, the left turn entry operation is executed in step S12.

In the embodiment described above, although a description has been given of the process of the vehicle control device 12, which recognizes only the railway crossing 140 and the intersection 160 as the specified region, another specified region, for example, a drawbridge or the like, may also be recognized.

3. Summary of Present Embodiment

The vehicle control device 12 comprises the other vehicle risk determination unit 84 which, in the case that the host vehicle 10 is approaching a left turn from the side road 110, which is the travel path (one travel path) of the host vehicle 10, into the main road 120 which is the other travel path through an intersecting position (intersecting region 110*in*) that intersects the side road 110, and when it is recognized by the external environment recognition unit 60 that the other vehicle 20F traveling in the main road 120 which is the other travel path is at a more rearward travel position {in FIG. 3, a position just before the railway crossing 140, and in FIG. 4, a position just before the intersection 160} on the main road 120 than the entry point (intersecting region 110*in* between the side road 110 and the main road 120) of the host vehicle 10, determines the risk to the other vehicle 20F that corresponds to the travel position of the other vehicle 20F, and the entry permission determination unit 86 that determines whether or not to permit the host vehicle 10 to make a left turn entry into the main road 120, which is the travel path of the other vehicle 20F, in accordance with the determined risk to the other vehicle 20F.

In accordance with such a configuration, in the case it is recognized that the other vehicle 20F is traveling on the main road 120 which is the other travel path at a more rearward travel position than the entry point (intersecting region 110*in* between the side road 110 and the main road 120) of the host vehicle 10, then the host vehicle 10, which is approaching a left turn into the main road 120 which is the other travel path determines the risk to the other vehicle 20F that corresponds to the travel position of the other vehicle 20F, and determines whether or not to permit the host vehicle 10 to enter into the main road 120 which is the other travel path in accordance with the determined risk to the other vehicle 20F. Therefore, driving of the host vehicle 10 that approaches a left turn into the main road 120 which is the other travel path can be appropriately controlled while suppressing the occurrence of the risk to the other vehicle 20F.

In this case, the other vehicle risk determination unit 84 is configured so as to determine the risk that, by the host vehicle 10 entering into the main road 120 which is the other travel path, the other vehicle 20F stops at a more rearward position on the main road 120, which is the other travel path, than the entry point (intersecting region 110*in* between the side road 110 and the main road 120) of the host vehicle 10, in accordance with the type of stopping position (type of the aforementioned specified region) of the other vehicle 20F, and therefore, the risk to the other vehicle 20F can be determined more reliably, and driving of the host vehicle 10 can be more appropriately controlled.

In this case, the configuration may be changed so that the other vehicle risk determination unit 84 determines whether or not the other vehicle 20F stops at a more rearward position on the main road 120, which is the other travel path, than the entry point (intersecting region 110*in* between the side road 110 and the main road 120) of the host vehicle 10, by the host vehicle 10 entering into the main road 120 which is the other travel path, and in the case it is determined to stop, determines the risk to the other vehicle 20F in accordance with the type of stopping position (type of the aforementioned specified region) of the other vehicle 20F.

Moreover, in the case that the type of stopping position (type of specified region) is the railway crossing 140 or the intersection 160, the other vehicle risk determination unit 84 determines that there is a risk to the other vehicle 20F, whereby the determination that there is a risk to the other vehicle 20F can be easily performed.

More specifically, by the other vehicle risk determination unit 84 determining that the risk level RL (see FIG. 6) of the other vehicle 20F is greater in the case that the stopping position is the railway crossing 140 than in the case that the stopping position is the intersection 160, the determination can be made in line with the actual traffic scenario.

Furthermore, the other vehicle risk determination unit 84 determines the risk level RL to the other vehicle 20F on the basis of the type of stopping position (type of specified region), and the length of the empty space L3 formed in the main road 120 which is the other travel path in front of the other vehicle 20F. Therefore, the determination can be made in a manner that is suitable for a more specified traffic scenario.

In this case, since the entry permission determination unit 86 is operated so as to change the entry condition (see FIG. 6) for which the host vehicle 10 enters into the main road 120 which is the travel path of the other vehicle 20F in accordance with the risk level RL to the other vehicle 20F, while suppressing the risk to the other vehicle 20F, driving of the host vehicle 10 can be controlled appropriately in line with the actual traffic scenario, and entry into the main road 120 which is the travel path of the other vehicle 20F is made possible.

The vehicle control device according to the present invention is not limited to the above-described embodiment, and it goes without saying that various additional or alternative configurations could be adopted therein without departing from the essence and gist of the present invention. For example, in the case that a following vehicle is recognized behind the other vehicle 20F, the other vehicle risk level RL and the permission to enter may be determined in accordance with a space L3 which also takes into condition an entry space for such a following vehicle.

The invention claimed is:

1. A vehicle control device that performs a driving control for a host vehicle, the vehicle control device comprising one or more processors, wherein
the one or more processors are configured to:
recognize another vehicle existing in a vicinity of the host vehicle;
in a case that the host vehicle is planning to enter from one travel path in which the host vehicle is traveling into another travel path through an intersecting position that intersects the one travel path, and when the one or more processors recognize that the other vehicle traveling in the other travel path is at a more rearward travel position on the other travel path than the intersecting position, determine a risk to the other vehicle that corresponds to the travel position; and
determine whether or not to permit the host vehicle to enter into the other travel path, in accordance with the determined risk to the other vehicle, and wherein
the one or more processors determine a risk predicted based on a scenario that the host vehicle enters into the other travel path and the other vehicle stops at a more rearward position on the other travel path than the intersecting position, the one or more processors determining the risk in accordance with a type of a stopping position, and the one or more processors determine a risk level to the other vehicle on a basis of the type of the stopping position, and a length of an empty space formed in the other travel path in front of the other vehicle, and
in a case where the determined risk level is a value of zero or an entry condition for entry of the host vehicle into the travel path of the other vehicle set in accordance with the risk level is satisfied, the one or more processors control the host vehicle to enter into the other travel path.

2. The vehicle control device according to claim 1, wherein the one or more processors determine that there is a risk to the other vehicle in a case that the type of the stopping position is a railway crossing or an intersection.

3. The vehicle control device according to claim 2, wherein the one or more processors determine that a risk level to the other vehicle is greater in a case that the stopping position is the railway crossing than in a case that the stopping position is the intersection.

4. The vehicle control device according to claim 1, wherein the one or more processors change the entry condition for entry into the travel path of the other vehicle in accordance with the risk level to the other vehicle.

5. A vehicle control device that performs a driving control for a host vehicle, the vehicle control device comprising one or more processors, wherein
the one or more processors are configured to:
recognize another vehicle existing in a vicinity of the host vehicle;
in a case that the host vehicle is planning to enter from one travel path in which the host vehicle is traveling into another travel path through an intersecting position that intersects the one travel path, and when the one or more processors recognize that the other vehicle traveling in the other travel path is at a more rearward travel position on the other travel path than the intersecting position, determine a risk to the other vehicle that corresponds to the travel position; and
determine whether or not to permit the host vehicle to enter into the other travel path, in accordance with the determined risk to the other vehicle, wherein
the one or more processors determine a risk predicted based on a scenario that the host vehicle enters into the other travel path and the other vehicle stops at a more rearward position on the other travel path than the intersecting position, the one or more processors determining the risk in accordance with a type of a stopping position, and the one or more processors determine that there is a risk to the other vehicle in a case that the type of the stopping position is a railway crossing or an intersection, and also reduce a risk level at which it becomes impossible for the other vehicle to move, in a case it is recognized that a crossing gate is descending at the railway crossing or a traffic signal device is displaying a red signal at the intersection, and
in a case where the determined risk level is a value of zero or an entry condition for entry of the host vehicle into the travel path of the other vehicle set in accordance with the risk level is satisfied, the one or more processors control the host vehicle to enter into the other travel path.

6. A vehicle control device that performs a driving control for a host vehicle, the vehicle control device comprising one or more processors, wherein
the one or more processors are configured to:
recognize another vehicle existing in a vicinity of the host vehicle;
in a case that the host vehicle is planning to enter from one travel path in which the host vehicle is traveling into another travel path through an intersecting position that intersects the one travel path, and when the one or more processors recognize that the other vehicle traveling in the other travel path is at a more rearward travel position on the other travel path than the intersecting position, determine a risk to the other vehicle that corresponds to the travel position; and
determine whether or not to permit the host vehicle to enter into the other travel path, in accordance with the determined risk to the other vehicle, and wherein
the one or more processors determine a risk predicted based on a scenario that the host vehicle enters into the other travel path and the other vehicle stops at a more rearward position on the other travel path than the intersecting position, the one or more processors determining the risk in accordance with a type of a stopping position, and the one or more processors determine, on a basis of the type of the stopping position and a traveling state of another vehicle traveling ahead of the other vehicle, a risk level at which it becomes impossible for the other vehicle traveling behind in the other travel path to move, and
in a case where the determined risk level is a value of zero or an entry condition for entry of the host vehicle into the travel path of the other vehicle set in accordance with the risk level is satisfied, the one or more processors control the host vehicle to enter into the other travel path.

\* \* \* \* \*